UNITED STATES PATENT OFFICE.

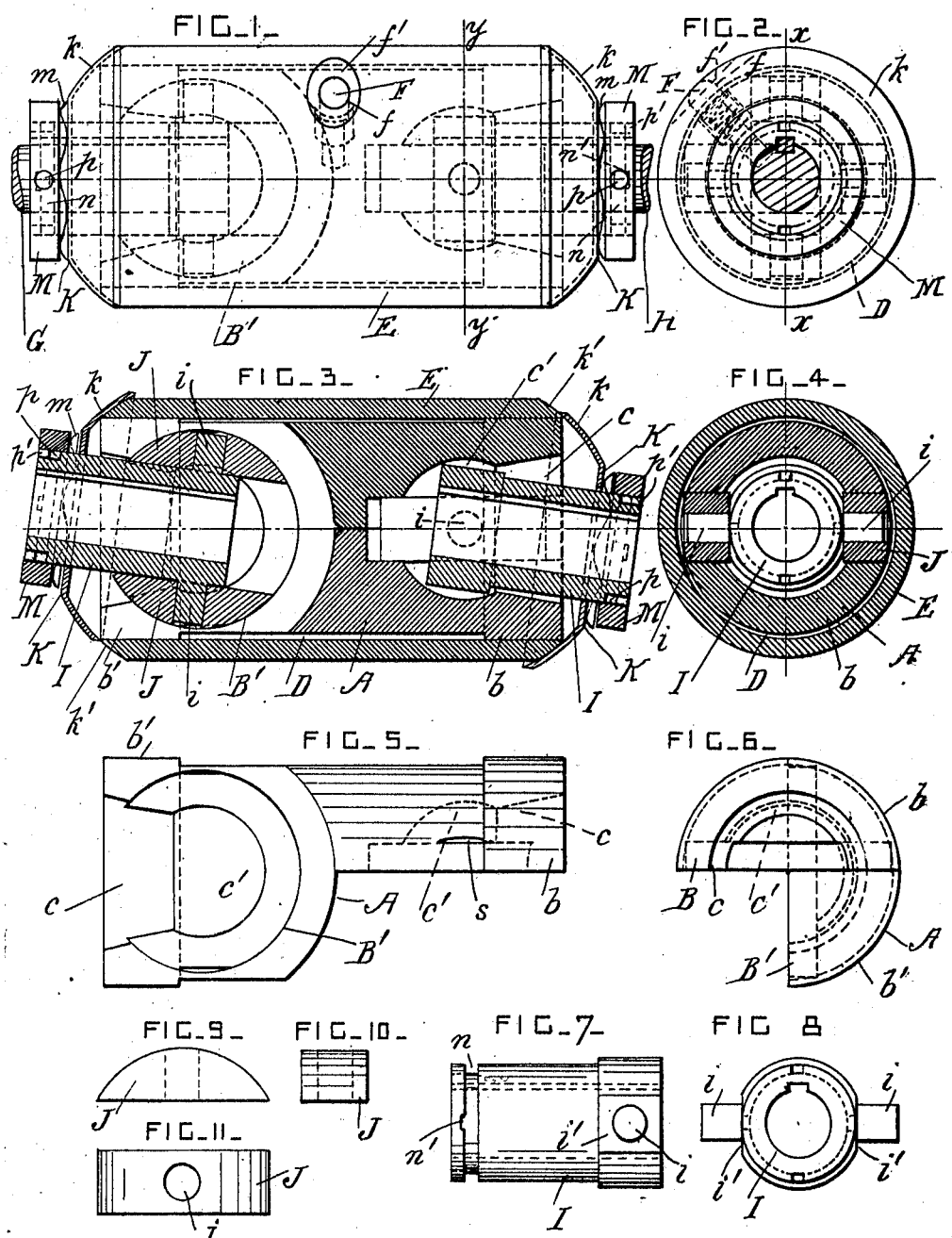

AUGUSTUS BIGELMAN, OF WATERVLIET, NEW YORK, ASSIGNOR TO THE VICTOR APPLIANCE COMPANY, OF WATERVLIET, NEW YORK.

FLEXIBLE COUPLING.

1,004,234.

Specification of Letters Patent. Patented Sept. 26, 1911.

Application filed November 8, 1910. Serial No. 591,360.

*To all whom it may concern:*

Be it known that I, AUGUSTUS BIGELMAN, a citizen of the United States, residing at Watervliet, in the county of Albany and State of New York, have invented certain new and useful Improvements in Flexible Couplings; and I do hereby declare the following to be a full, clear, and exact description of the invention, such as will enable others skilled in the art to which it appertains to make and use the same.

This invention relates to flexible couplings for uniting driving shafts; and it consists in the novel construction and combination of the parts hereinafter fully described and claimed whereby a driving connection is established between the shafts without the use of bolts or other similar fastening devices.

In the drawings, Figure 1 is a side view of the coupling. Fig. 2 is an end view of the coupling. Fig. 3 is a longitudinal section, taken on the line $x-x$ in Fig. 2. Fig. 4 is a cross-section taken on the line $y-y$ in Fig. 1. Fig. 5 is a detail side view of one part or section of the body. Fig. 6 is an end view of the same. Fig. 7 is a detail side view of one of the sleeves. Fig. 8 is an end view of the same. Figs. 9, 10, and 11 are respectively a side view, end view and a plan view of one of the shoes.

The body of the coupling is formed of two similar halves or parts A, which are adapted to be secured side by side. Each part A has similar half sockets B and B' at its ends. These half sockets may be arranged in the same plane so that each part A is substantially a long half cylinder, or they may be arranged at a right angle to each other so that each part A is formed of two short half cylinders $b$ and $b'$ arranged end to end and at a right angle to each other. The sockets B and B' are sector-shaped, and they are provided with conical entrances $c$, and spherical recesses $c'$. The spherical recesses $c'$ are formed concentric with the sockets. The middle portion of the coupling body is provided with a circumferential chamber or groove D for oil.

E is a cylindrical housing which is slid over the coupling body after its halves have been placed together. One of the body parts is provided with a spring-pressed pin F which engages with a hole $f$ in the housing E. The pin F is arranged in a hole or recess in the body part, and its outer end is rounded over. The housing E has a flat place $f'$ formed around the end of the pin, and this formation of the pin and housing permits the pin to be pressed inward with facility when it is desired to disengage the housing from the body portion. The pin F can also be pressed inward so as to pour oil into the chamber D.

The two shafts G and H to be united by the coupling have similar coupling sleeves I secured on them. Each sleeve I has trunnions $i$ at one end portion. These trunnions may be formed integral with the sleeve, or they may be formed by passing a pin crosswise through the sleeve, and the sleeve preferably has an enlargement and flattened side portions $i'$ around the trunnions.

J are shoes provided with holes $j$ which are mounted on the trunnions $i$. These shoes are arc-shaped in form, and they are arranged to work in the sockets of the body portion. The conical entrances $c$ and the spherical recesses $c'$ permit the sleeves to move to a limited extent on their trunnions as shown in Fig. 3, so that the coupling has the required flexibility, and will connect shafts which are not in line with each other.

K are guard-cups of thin sheet metal or other suitable material. These cups are arranged on the sleeves I, and they have spherical portions $k$ which are substantially concentric with the trunnions, and which engage with spherical surfaces $k'$ on the ends of the housing E. Each sleeve has a collar M secured on its free end portion, and a spring washer $m$ of any approved form is interposed between the collar and the guard-cup. These washers are preferably formed of corrugated sheet metal, and the collars are preferably secured to the sleeves by bayonet-joints, but the collars may be secured by any other approved means. The sleeve has a circumferential groove $n$ and a recess $n'$, and the collar has a pin $p$ which is slid into the groove $n$ through a slot $p'$. When the collar is turned around a little the pin $p$ slips into the recess $n'$, and the spring washer prevents it from slipping out again. The spring washer also holds the guard-cap in engagement with the end of the housing so that the oil can not escape and so that dust can not enter. The oil in the chamber D finds its way to the shoes through any convenient slots or holes s in the body portion and enables the shoes and trunnions to work freely. No screw-threaded bolts or other similar fastening devices are used in the construction of this coupling, and the shafts can be uncoupled and coupled with ease and quickness. The coupling is inexpensive to manufacture, and is specially intended for use in connection with the engines of motor-boats and automobiles, and it may be used wherever a flexible coupling is desirable.

What I claim is:

1. In a coupling, the combination, with a body portion formed of longitudinally separable sections and provided with sector shaped pockets in each end portion, of shoes arranged in pairs and engaging pivotally with the said pockets, sleeves pivoted between the pairs of shoes and adapted to be secured on the shaft sections, and means for securing the sections of the body portion in position.

2. In a coupling, the combination, with a body portion formed of two similar parts arranged side by side, of sleeves pivotally connected with the end portions of the body portion and adapted to be secured to the shafts, a housing inclosing the parts of the body portion, and a spring-pressed pin for locking the said body portion to the housing.

3. In a coupling, the combination, with a body portion formed of two similar parts arranged side by side, each part comprising two half cylinders arranged end to end and at an angle to each other, of sleeves pivotally connected with the end portions of the body portion, and a housing inclosing the parts of the body portion.

4. In a coupling, the combination, with a body portion formed of two similar parts arranged side by side, each end of the body portion being provided with sector-shaped sockets, of sleeves adapted to be secured to the shafts, shoes pivoted to the said sleeves and engaging pivotally with the said sockets, and a housing inclosing the parts of the body portion.

5. In a coupling, the combination, with a body portion formed of two similar parts arranged side by side, each end of the body portion being provided with sector-shaped sockets having conical entrances and spherical recesses formed concentric with the sockets, of sleeves adapted to be secured to the shafts, shoes pivoted to the said sleeves and engaging pivotally with the said sockets, and a housing inclosing the parts of the body portion.

6. In a coupling, the combination, with a body portion formed of two similar parts arranged side by side and having an oil recess at the middle part of its periphery, of a housing encircling the said body portion and provided with an oil-hole, and sleeves pivotally connected with the end portions of the body portion and adapted to be secured to the shafts, the pivots of the said sleeves being in communication with the said oil recess.

7. In a coupling, the combination, with a body portion formed of longitudinally separable sections and provided with sector-shaped pockets in one end portion, of two shoes which engage pivotally with the said pockets, a sleeve pivoted between the said shoes and adapted to be secured to one shaft section, connecting devices at the other end of the body portion for engaging with the other shaft section, and means for securing the sections of the body portion in position.

8. In a coupling, the combination, with a body portion formed of separable sections and provided with pockets, of means for connecting a shaft to one end of the body portion, a sleeve provided with means for connecting it to another shaft and having trunnions at one end, shoes mounted on the said trunnions and engaging pivotally with the said pockets, and a housing inclosing the said sections.

9. In a coupling, the combination, with a body portion formed of two similar parts arranged side by side, each end of the body portion being provided with sector-shaped sockets, of sleeves adapted to be secured to the shafts and provided with trunnions, shoes pivoted on the said trunnions and engaging pivotally with the said sockets, and a housing inclosing the parts of the body portion.

In testimony whereof I have affixed my signature in the presence of two witnesses.

AUGUSTUS BIGELMAN.

Witnesses:
 CHARLES S. ALDRICH,
 L. B. CLEXTON.